Jan. 11, 1944.    E. M. SMITH    2,339,116
TEMPERATURE MEASURING APPARATUS
Filed Aug. 2, 1940
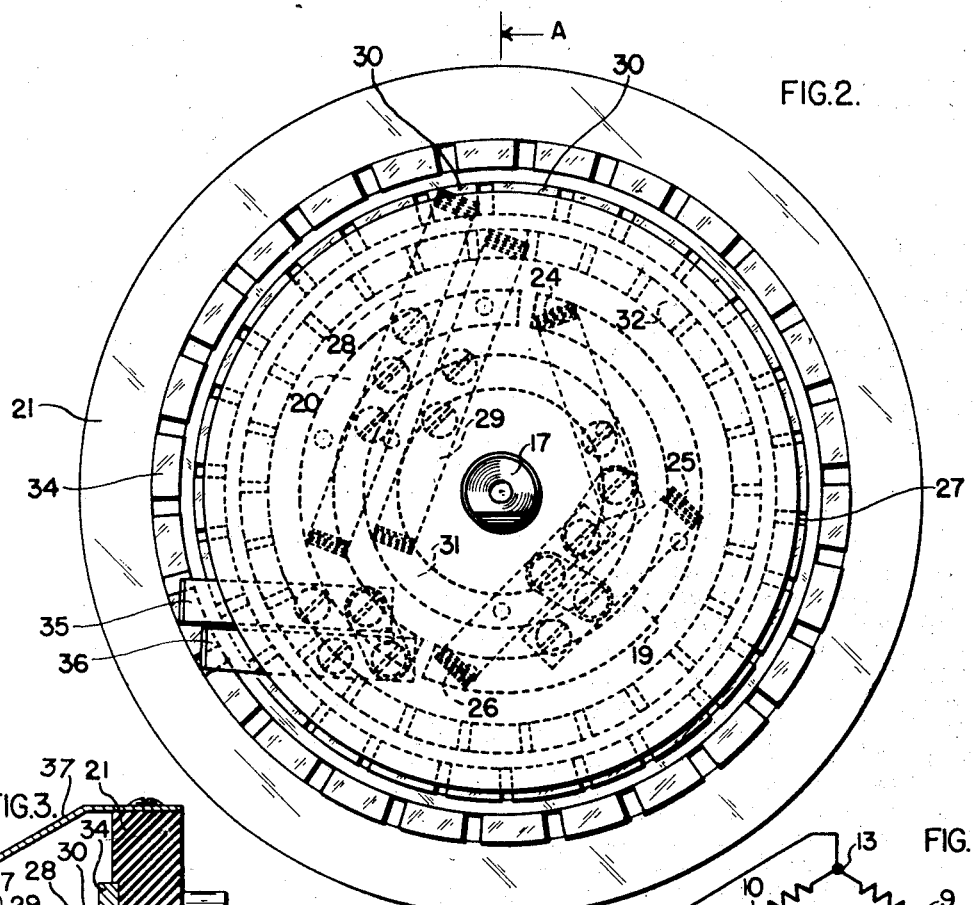
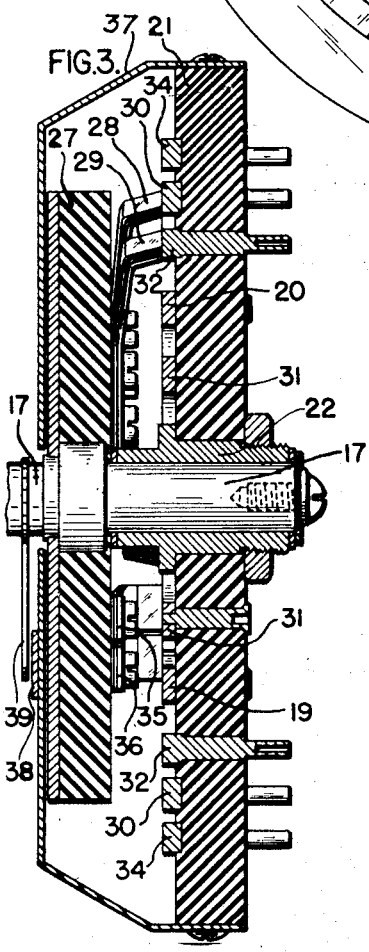
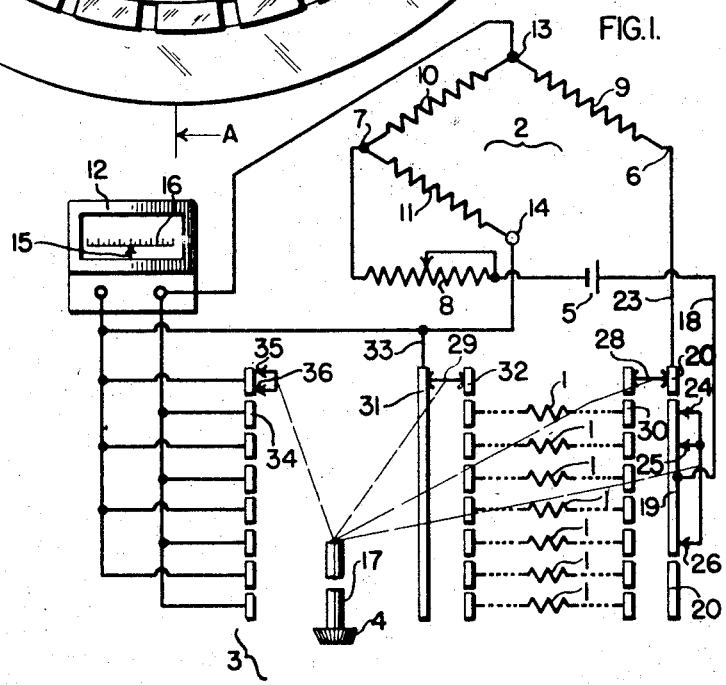
INVENTOR.
EDGAR M. SMITH
BY
ATTORNEY Patented Jan. 11, 1944

2,339,116

UNITED STATES PATENT OFFICE 2,339,116

TEMPERATURE MEASURING APPARATUS

Edgar M. Smith, Trenton, N. J., assignor to The Brown Instrument Company, Philadelphia, Pa., a corporation of Pennsylvania Application August 2, 1940, Serial No. 349,769

8 Claims. (Cl. 73—342)

The present invention relates to electrical measuring instruments of the Wheatstone bridge type, and particularly to measuring instruments of the Wheatstone bridge type, the state of balance or unbalance of which is indicated by a sensitive indicating instrument having a deflectable element, utilized for measuring the magnitudes of a plurality of unknown resistances.

My present invention has especial utility in temperature indicating systems, and particularly in such systems which utilize a single instrument to indicate the temperature at any of a number of remote points by means of a plurality of search resistances located at various remote points where it is desired to ascertain the temperature.

An object of the invention is to provide an improved measuring instrument of the type referred to above in which the connections for effecting a measurement of the unknown resistances are accomplished by a single switching device whereby the manual operations required for effecting the measurements are reduced to a minimum.

Another object of the invention is to provide an improved switching device for use in measuring instruments of the type referred to above in which slamming of the indicating instrument deflecting element or pointer during the time the switching operation is being effected is prevented.

A further object of the invention is to provide an improved switching device for use in measuring instruments of the type referred to above which disconnects the battery or energizing source of electromotive force from the bridge when in its "off" position and only in that position.

The various features of novelty which characterize my invention are pointed out with particularity in the claims annexed to and forming a part of this specification. For a better understanding of the invention, however, its advantages and specific objects obtained with its use, reference should be had to the accompanying drawing and descriptive matter in which I have illustrated and described a preferred embodiment of the invention.

Of the drawing:

Fig. 1 is a diagrammatic representation of a Wheatstone bridge resistance thermometer type measuring instrument provided with switching mechanism in accordance with my invention;

Fig. 2 is a detail view, parts in elevation, of a preferred form of the switching mechanism of my invention with the cover removed; and Fig. 3 is a sectional view on the line A—A of the switch mechanism shown in Fig. 2.

In Fig. 1 I have illustrated, more or less diagrammatically, the use of my invention in a temperature measuring system in which a plurality of identical temperature responsive resistances 1 located at different remote points where it is desired to determine the temperature, are adapted to be successively connected or switched inton one arm of a Wheatstone bridge network 2 by a novel switch mechanism 3 to be described in detail hereinafter. Switch mechanism 3 is manually operable to switch the resistances 1 into the bridge network in succession by manipulation of a knob 4.

Energizing electromotive force is supplied the bridge network 2 under control of the switch mechanism 3 by a battery 5 which is connected across the energizing terminals 6 and 7 of the bridge network. An adjustable resistance 8 is preferably provided in the battery connection to facilitate the adjustment of the electromotive force applied to the bridge network to the desired value.

The other arms of the bridge network 2 include fixed resistances 9, 10 and 11 which are suitably proportioned to the resistances of the resistances 1 when the latter are subjected to a predetermined temperature.

The state of balance and the extent of unbalance of the bridge network 2 is ascertained by means of an electrical indicating instrument 12 which may be a sensitive volt-meter or galvanometer and which is connected across the balancing terminals 13 and 14 of the bridge network. The indicating instrument 12 is provided with the usual deflecting pointer 15 and dial 16, the latter having appropriate scale divisions and temperature markings for the range of temperatures to be measured. The instrument 12 may desirably be provided with the usual zero adjustment screw, not shown in order not to confuse the drawing, which changes the position of the pointer 15 with respect to the dial 16 by moving the fixed abutment of the spring which urges the pointer 15 to its zero position.

The knob 4 of switch mechanism 3 is connected rigidly to a shaft 17 which, in turn, is mechanically connected to and is adapted, when rotated by manipulation of knob 4, to actuate a plurality of different rotary switches. These rotary switches control the supply of energizing electromotive force to the bridge network 2 from the battery 5, are adapted to successively connect the temperature responsive resistances 1 into the bridge network 2, and are also adapted to effect an operation which prevents slamming of the pointer 15 of instrument 12.

As illustrated, the negative terminal of the battery 5 is connected through the adjustable resistance 8 to the bridge energizing junction 7 and the positive terminal of the battery is connected by a conductor 18 to the section 19 of a split ring having a second section 20. The ring sections 19 and 20, as seen in Figs. 2 and 3, are insulated from each other and are rigidly mounted on a circular disc 21 of Bakelite or other suitable insulating material, being riveted or otherwise secured thereto. The ring sections 19 and 20 are so positioned on disc 21 that their center is coincident with the center of shaft 17 which extends through the disc 21. The shaft 17 is supported for rotation by a bearing 22 provided in the disc 21.

The ring section 20 is connected by a conductor 23 to the bridge energizing junction 6 and is adapted to be electrically connected to the ring section 19 and thereby to the positive terminal of battery 5 by means of three flexible electrically connected brushes indicated at 24, 25 and 26. The brushes 24, 25 and 26 are spaced slightly more than 90° apart on a circle the same diameter as the ring comprised of sections 19 and 20 and are rigidly secured by screw or other suitable means to a circular disc 27 of insulating material. The disc 27 is rigidly mounted at the center thereof on shaft 17.

When the brushes 24, 25 and 26 are in the position wherein they engage only the ring section 19, the supply of energizing electromotive force from the battery 5 to the bridge network 2 is prevented. The switch mechanism is then in its "off" position. When the brushes 24, 25 and 26 are moved downward, as seen in Fig. 1 or clockwise as seen in Fig. 2, however, they electrically connect the ring sections 19 and 20 and thereby complete the energizing circuit to bridge network 2 from battery 5. This energizing circuit may be traced from the positive terminal of battery 5 to conductor 18, ring section 19, brushes 24, 25 and 26, ring section 20, conductor 23 to the bridge energizing junction 6, the bridge network 2, the bridge energizing junction 7 and resistance 8 back to the negative terminal of battery 5.

In order that there will be only one position of the brushes 24, 25 and 26 in which the supply of energizing electromotive force to the bridge network is cut off or in other words in which the switch mechanism 3 is in its "off" position, the ring section 19 is made slightly longer than the section 20. When this is done, it will be seen by reference to Fig. 2 that in every other position of the brushes 24, 25 and 26 except that shown the brushes will interconnect the ring sections 19 and 20. Preferably the ring section 19 is made one index point longer than the section 20 for switch mechanisms having an odd number of index points and two index points longer than the section 20 for switch mechanisms having an even number of index points.

The temperature responsive resistances 1 are adapted to be selectively connected into the bridge network 2 between the energizing junction 6 and the balancing junction 14 by means including a pair of flexible brushes 28 and 29 which are rigidly secured by screw means to the insulating block 27 as shown. The brush 28 is adapted to engage the ring sections 19 and 20 at one end thereof and is preferably of sufficient width to bridge the gap between those sections. The brush 28 is so positioned relatively to the brushes 24, 25 and 26 that when the latter are adjusted to the "off" position of the switch mechanism, one end of brush 28 is in engagement with the ring section 20, which section is then not energized. At its other end, the brush 28 is adapted, when moved, to successively engage each one of a number of spaced arcuate contact segments 30 which are rigidly secured to the insulating block 21. This end of the brush 28 is desirably of sufficient width to bridge the gap between the contact segments 30. The contact segments 30 are evenly spaced in a circle on the block 21, the opening in the block for shaft 17 being at the center of said circle, and are each electrically connected with one end of a respective temperature responsive resistance 1. To this end the contact segments 30 are desirably provided with soldering lugs which extend through the block 21 as seen in Fig. 3.

The brush 29 is in sliding engagement with a contact ring 31 at one end and is adapted, when moved to successively engage at its other end a number of arcuate contact segments 32. The contact ring 31 and arcuate contact segments 32 are rigidly mounted on the insulating block 21 in any suitable manner. The contact ring 31 is connected by a conductor 33 to the balancing terminal 14 of the bridge network 2. The contact segments 32 are evenly spaced in a circle on the block 21 with the opening for shaft 17 being at the center of said circle, and are each connected to the other terminals of a respective temperature responsive resistance 1.

The brushes 28 and 29 and the associated contact segments 30 and 32 are so arranged that on rotation of the shaft 17, the temperature responsive resistances 1 are successively connected into the bridge network 2 between the junctions 6 and 14.

When the brushes 28 and 29 are adjusted from one contact segment 30 and 32, respectively, to the next, two corresponding and adjacent temperature responsive resistances 1 are simultaneously connected into the bridge network 2 since the brushes 28 and 29 are wide enough to bridge the gap between adjacent contact segments 30 and 32 whereupon the effective resistance between the bridge junctions 6 and 14 is substantially reduced. This reduction in resistance between bridge junctions is sudden and produces an appreciable unbalance of the bridge network and thereby tends to cause a violent slamming of the indicating instrument pointer 15.

In accordance with my present invention, this undesirable action is avoided by shunting the terminals of the instrument 12 whenever the switch mechanism is adjusted to switch a different one of the temperature responsive resistances 1 into the bridge network 2. To this end a number of evenly spaced arcuate contact segments 34 which are adapted to be engaged by a pair of flexible brushes 35 and 36 are provided. The contact segments 34 are mounted on the insulating block 21 and are disposed in a circle about the opening for shaft 17. The brushes 35 and 36 are mounted closely adjacent each other on the insulating block 27 and are electrically connected to each other. The brushes 35 and 36 are of such width relative to the width of the contact segments 34 that when a single temperature responsive resistance 1 is connected into the bridge network 2, both of the brushes 35 and 36 are in engagement with one only of the contacts 34. Preferably the brushes 35 and 36 are of greater width than the width of a contact segment 34, but are slightly less than the total width of a contact segment 35 plus the width of the gaps on both sides, as shown in Fig. 2. Thus, on only slight movement of the brushes 35 and 36 and before the brushes 28 and 29 have been adjusted from one contact segment 30 and 32, respectively, to the next and thereby before two temperature responsive resistances 1 have been simultaneously connected into the bridge network 2, two adjacent contact segments 34 are bridged by the brushes 35 and 36. Alternate ones of the contact segments 34 are connected to one terminal of the instrument 12 and the remaining contact segments 34 are connected to the other terminal of instrument 12 so that the effect of the brushes 35 and 36 thus bridging two adjacent contacts 34 is to shunt the instrument terminals and thereby prevent slamming of the instrument pointer 15 as the switch mechanism 3 is adjusted to connect a different one of the temperature responsive resistances 1 into the bridge network 2.

It is noted that with this provision for preventing slamming of the instrument pointer 15, it is not necessary to interrupt the supply of energizing electromotive force to the bridge network 2 whenever a different one of the resistances 1 is connected in the bridge network, nor is it necessary to provide narrow contact segments and brushes to prevent the simultaneous connection of two resistances 1 in the bridge network. Therefore the necessary adjustments to the switch mechanism 3 in lining up the associated brushes and contact segments are not critical and may be readily made.

Referring to Fig. 2 it will be seen that adjacent contact segments 30 are of different size and that alternate ones of the contact segments 30 are of the same size. Contact segments 30 of two different sizes have been provided in the novel switch mechanism of my invention in order to reduce the cost of construction of said mechanism. It is noted that when the contact segments 30, 32 and 34 are arranged in rings of different diameter, the arcuate length of the contact segments 30, 32 and 34 must be different if the same spacing between the contacts is to be maintained. Therefore, in order to provide rings of contact segments of uniform length in quantity production it would require the use of three different tools for stamping out each of the sets of contact segments 30, 32 and 34. In the novel switch mechanism of my invention the number of tools for stamping out the contact segments has been reduced to two by making the smaller contact segment 30 the same size as the contact segments 32 which are on a smaller diameter ring and by making the larger contact segment 30 the same size as the contact segments 34 which are on a larger diameter ring. When this is done, the spacing between the contact segments 30 is approximately the same as that between the segments 32 and 34. This arrangement permits a substantial reduction in the amount of equipment involved in constructing the switch mechanism 3.

The switch mechanism 3 is provided with a cup-shaped cover 37 of metal or other suitable material, as shown in Fig. 3, for protecting it from dirt, fumes, etc., in the atmosphere to which the switch mechanism is subjected. The cover 37 is fitted over the outer or circumferential edge of the disc 21 and is supported thereby, being held rigid therewith by screw or other means. A scale 38 having suitable markings or index points identifying each of the temperature responsive resistances 1 and also the "off" position of the switch mechanism is provided on the front of the cover 37. A pointer 39 mounted rigidly on the shaft 17 is disposed in cooperative relation with the scale 38 for indicating the position to which the switch is adjusted.

With this arrangement the switch mechanism 3 may be readily adjusted by manipulation of the single knob 4 to connect the desired one of the temperature responsive resistances into the bridge network 2, to shunt the terminals of instrument 12 during the switching operation to prevent slamming thereof, and to deenergize the system when the desired readings have been obtained.

In order not to confuse the drawing only eight contact segments 30, 32 and 34 have been shown in Fig. 1 whereas twenty-six such segments have been shown in Fig. 2. It will be apparent to those skilled in the art that the switch mechanism may be provided with any desired number of contact segments to thereby permit the reading of the temperature condition at a corresponding number of remote points.

While in accordance with the provisions of the statutes, I have illustrated and described the best form of my invention now known to be, it will be apparent to those skilled in the art that changes may be made in the form of the apparatus disclosed without departing from the spirit of my invention as set forth in the appended claims, and that in some cases certain features of my invention may sometimes be used to advantage without a corresponding use of other features.

Having now described my invention, what I claim as new and desire to secure by Letters Patent is:

1. In a measuring system, the combination with a plurality of impedances to be measured of an impedance measuring instrument having a plurality of energizing terminals, a source of electrical energy adapted to be connected to the terminals of said instrument for energizing the latter, switching means having a plurality of positions for controlling the connection of said impedances to said instrument and arranged during the switching operation of successive impedances to said instrument to simultaneously connect more than one impedance to said instrument, a second switching means having a plurality of positions operable coincidentally with the first mentioned switching means for controlling the connection of said source of electrical energy to said instrument, said second switching means having only one position in which said source of electrical energy is disconnected from said instrument, and a third switching means having a plurality of positions operable coincidentally with the first mentioned switching means for shunting the terminals of said instrument to prevent sudden surges of current in said instrument during the switching operation due to the simultaneous connection of more than one impedance to said instrument.

2. In a measuring system, the combination with a plurality of impedances to be measured of an impedance measuring instrument having a plurality of energizing terminals, a source of electrical energy adapted to be connected to the terminals of said instrument for energizing the latter, switching means having a plurality of positions for controlling the connection of said impedances to said instrument and arranged during the switching operation of successive impedances to said instrument to simultaneously connect more than one impedance to said instrument, a second switching means having a plurality of positions for controlling the connection of said source of electrical energy to said instrument, said second switching means having only one position in which said source of electrical energy is disconnected from said instrument, a third switching means having a plurality of positions for shunting the terminals of said instrument to prevent sudden surges of current in said instrument during the switching operation due to the simultaneous connection of more than one impedance to said instrument, and a device common to all of said switching means for actuating the latter to their different positions.

3. In a temperature measuring system, the combination with a plurality of temperature responsive resistances to be measured of an electrical measuring instrument having a plurality of energizing terminals and calibrated in terms of temperature for indicating the temperature of said resistances, a source of electrical energy adapted to be connected to the terminals of said instrument for energizing the latter, switching means having a plurality of positions for controlling the connection of said resistances to said instrument and arranged during the switching operation of successive resistances to said instrument to simultaneously connect more than one resistance to said instrument, a second switching means having a plurality of positions for controlling the connection of said source of electrical energy to said instrument, said second switching means having only one position in which said source of electrical energy is disconnected from said instrument, a third switching means having a plurality of positions for shunting the terminals of said instrument to prevent sudden surges of current in said instrument during the switching operation due to the simultaneous connection of more than one resistance to said instrument, and means common to all of said switching means for selectively actuating the latter to connect a desired one of said resistances to said instrument or to disconnect said source of energy from said instrument.

4. In a measuring system, the combination with a plurality of impedances to be measured of an impedance measuring network, a measuring instrument having a plurality of terminals and responsive to a characteristic of said impedance measuring network, a connection between the terminals of said measuring instrument and said impedance measuring network, a source of electrical energy adapted to be connected to said impedance measuring network for energizing the latter, switching means having a plurality of positions for controlling the connection of said impedances to said impedance measuring network and arranged during the switching operation of successive impedances to said network to simultaneously connect more than one of said impedances to said network, a second switching means having a plurality of positions for controlling the connection of said source of electrical energy to said instrument, said second switching means having only one position in which said source of electrical energy is disconnected from said instrument, and a third switching means having a plurality of positions operable coincidentally with the first mentioned switching means for shunting the terminals of said instrument to prevent surges of current in said instrument during the switching operation due to the simultaneous connection of more than one impedance to said network.

5. In a measuring system, the combination with a plurality of impedances to be measured of an impedance measuring network, a measuring instrument having a plurality of terminals and responsive to a characteristic of said impedance measuring network, a connection between the terminals of said measuring instrument and said impedance measuring network, a source of electrical energy adapted to be connected to said impedance measuring network for energizing the latter, switching means having a plurality of positions for controlling the connection of said impedances to said impedance measuring network and arranged during the switching operation of successive impedances to said network to simultaneously connect more than one of said impedances to said network, a second switching means having a plurality of positions for controlling the connection of said source of electrical energy to said instrument, said second switching means having only one position in which said source of electrical energy is disconnected from said instrument, a third switching means having a plurality of positions for shunting the terminals of said instrument to prevent surges of current in said instrument during the switching operation due to the simultaneous connection of more than one impedance to said network, and a device common to all of said switching means for actuating the latter to their different positions.

6. In a temperature measuring system, the combination with a plurality of temperature responsive resistances to be measured of a resistance measuring network, an electrical instrument having a plurality of terminals and responsive to a characteristic of said resistance measuring network and calibrated in terms of temperature for indicating the temperature of said resistances, a connection between the terminals of said measuring instrument and said resistance measuring network, a source of electrical energy adapted to be connected to said resistance measuring network for energizing the latter, switching means having a plurality of positions for controlling the connection of said resistances to said resistance measuring network and arranged during the switching operation of successive resistances to said network to simultaneously connect more than one of said resistances to said network, a second switching means having a plurality of positions for controlling the connection of said source of electrical energy to said resistance measuring network, said second switching means having only one position in which said source of energy is disconnected from said resistance measuring network, a third switching means having a plurality of positions for shunting the terminals of said instrument to prevent surges of current in said instrument during the switching operation due to the simultaneous connection of more than one impedance to said network, and means common to all of said switching means for selectively actuating the latter to connect a desired one of said resistances to said instrument or to disconnect said source of energy from said resistance measuring network.

7. In a measuring system, the combination with a plurality of impedances to be measured of an impedance measuring network having a pair of balancing terminals and a pair of energizing terminals, a measuring instrument responsive to a characteristic of said network, connections between the balancing terminals of said network and said instrument, a source of electrical energy for energizing said network, and a switch mechanism for controlling the connection of said impedances and said energizing source to said network and arranged during the switching of successive impedances to said network to simultaneously connect more than one impedance to said network, said switch mechanism including a supporting base, a plurality of contact segment assemblies in the form of circles having different diameters secured to said base, separate connections each including one of said impedances between each of the contact segments on one of said circles and a contact segment individual thereto on another of said circles, a plurality of contact rings concentric with the circles of said contact segment assemblies but of diameters different therefrom and from each other and secured to said base, at least one of said contact rings being split into two sections one of which is longer than the other, connections between one energizing terminal of said network and the longer section of said split contact ring including said source of energy, a connection from the shorter section of said split contact ring to the other energizing terminal of said network, a connection between another of said contact rings and one of the balancing terminals of said network, a brush supporting structure disposed in cooperative relation with said base and rotatable relatively thereto, the axis of rotation of said brush supporting structure coinciding with the common center of the circles of said contact segment assemblies and the contact rings, means to relatively rotate said base and brush supporting structure, a plurality of brushes secured to said brush supporting structure, one of said brushes disposed to successively connect the contact segments of one of said contact assemblies to said split contact ring, another of said brushes disposed to successively connect the contact segment of said another of said contact segment assemblies to the other of said contact rings, and at least three others of said brushes connected to each other and disposed to connect the sections of said split contact ring, the length of the sections of said split contact ring being so proportioned and said three last mentioned brushes being so positioned that they are all adapted to engage the longer section of said split contact ring only in one position of said brush supporting structure relatively to said base, a connection between alternate contact segments on another of said contact segment assemblies and one terminal of said instrument, a connection between the remaining contact segments on said last mentioned contact assembly and the other terminal of said instrument, and another of said brushes disposed to connect the contact segments of said last mentioned contact segment assembly to shunt the terminals of said instrument to prevent sudden surges of current in said instrument due to the connection of more than one impedance to said network during the switching operation.

8. In a measuring system, the combination with a plurality of impedances to be measured of an impedance measuring network having a pair of balancing terminals and a pair of energizing terminals, a measuring instrument responsive to a characteristic of said network, connections between the balancing terminals of said network and said instrument, a source of electrical energy for energizing said network, a connection from one terminal of said source to one energizing terminal of said network, and a switch mechanism for controlling the connection of said impedances and the other terminal of said energizing source to said network in such a manner as to prevent sudden surges of current in said instrument during the switching operation due to more than one impedance being simultaneously connected to said network including a supporting base, a first contact segment assembly secured to said base and having contact segments all of the same size uniformly disposed in a circle, a connection from all but one of the contact segments on said first contact segment assembly to one terminal of an individual one of said plurality of impedances to be measured, a contact ring associated with said first contact segment assembly, a connection between said contact ring and one balancing terminal of said network, a second contact segment assembly secured to said base and having contact segments all of the same size uniformly disposed in a circle concentric with but of different diameter than the circle of said first mentioned contact segment assembly, a connection between atlernate contacts of said second contact assembly and one balancing terminal of said network, a connection between the remaining contacts of said contact segment assembly and the other balancing terminal of said network, a third contact segment assembly secured to said base and having contact segments uniformly disposed in a circle concentric with but of diameter intermediate the diameters of the circles of said first and second mentioned contact segment assembly, alternate contact segments of said third mentioned contact segment assembly being substantially equal in size to the contact segments of said first and second mentioned contact segment assemblies whereby the spacing between the contact segments of all of the assemblies is approximately the same, and brush means disposed in cooperative relation with each one of said contact segment assemblies and each of said contact rings to successively connect the contact segments on said first contact segment assembly to said first contact ring and simultaneously to connect the contact segments of said third contact segment assembly to said second contact ring, and during the switching operation to shunt adjacent contact segments on said second contact segment assembly.

EDGAR M. SMITH.